United States Patent [19]

Kiewit

[11] Patent Number: 4,930,011

[45] Date of Patent: May 29, 1990

[54] METHOD AND APPARATUS FOR IDENTIFYING INDIVIDUAL MEMBERS OF A MARKETING AND VIEWING AUDIENCE

[75] Inventor: David A. Kiewit, Palm Harbor, Fla.

[73] Assignee: A. C. Nielsen Company, Northbrook, Ill.

[21] Appl. No.: 227,187

[22] Filed: Aug. 2, 1988

[51] Int. Cl.$^5$ ............................................... H04H 9/00
[52] U.S. Cl. ......................................... 358/84; 455/2; 455/604; 340/825.34
[58] Field of Search ....................... 358/84; 455/2, 604; 379/92; 340/825.31, 825.34, 825.49, 825.36; 902/5

[56] References Cited

U.S. PATENT DOCUMENTS

| | | | |
|---|---|---|---|
| 3,056,135 | 9/1962 | Currey et al. | 358/84 X |
| 4,275,385 | 6/1981 | White | 340/825.49 |
| 4,331,973 | 5/1982 | Eskin et al. | 358/84 |
| 4,495,496 | 1/1985 | Miller, III | 340/825.49 X |
| 4,546,382 | 10/1985 | McKenna et al. | 358/84 |
| 4,567,511 | 1/1986 | Smith et al. | 358/84 |
| 4,573,046 | 2/1986 | Pinnow | 340/825.56 |
| 4,591,854 | 5/1986 | Robinson | 340/825.31 |
| 4,600,829 | 7/1986 | Walton | 902/5 X |
| 4,626,904 | 12/1986 | Lurie | 358/84 |
| 4,644,509 | 2/1987 | Kiewit et al. | 358/84 X |
| 4,646,145 | 2/1987 | Percy et al. | 358/84 |
| 4,652,915 | 3/1987 | Heller, III | 358/84 |
| 4,658,290 | 4/1987 | McKenna et al. | 358/84 |
| 4,695,879 | 9/1987 | Weinblatt | 358/84 |
| 4,723,302 | 2/1988 | Fulmer et al. | 358/84 X |
| 4,794,268 | 12/1988 | Nakano et al. | 340/825.31 |

Primary Examiner—Keith E. George
Attorney, Agent, or Firm—Mason, Kolehmainen, Rathburn & Wyss

[57] ABSTRACT

A method and apparatus are provided for identifying predetermined individual members of a television viewing audience/marketing group in a plurality of monitored areas. A plurality of predetermined identification signals are stored each corresponding to one of the predetermined individual members. A transmitter device for transmitting a unique predetermined identification signal is associated with each of the predetermined individual members. A receiver device in each of the plurality of monitored areas receives the transmitted predetermined identification signals and applies the received signals to an associated memory device used for storing the received individual member signals. A central processor periodically retrieves the stored individual member signals from each memory device. The received predetermined identification signals are compared with the stored predetermined identification signals to identify the predetermined individual members and further processed to correlate each of the identified individual members at different ones of the monitored areas.

19 Claims, 2 Drawing Sheets

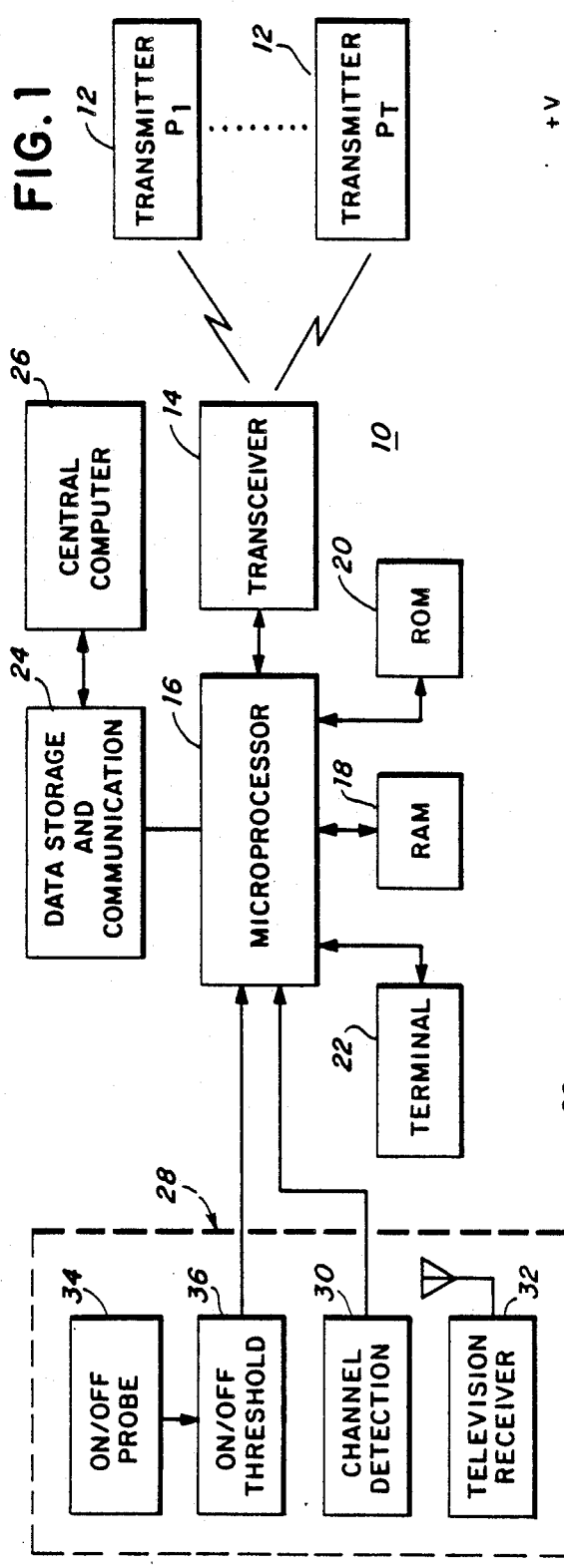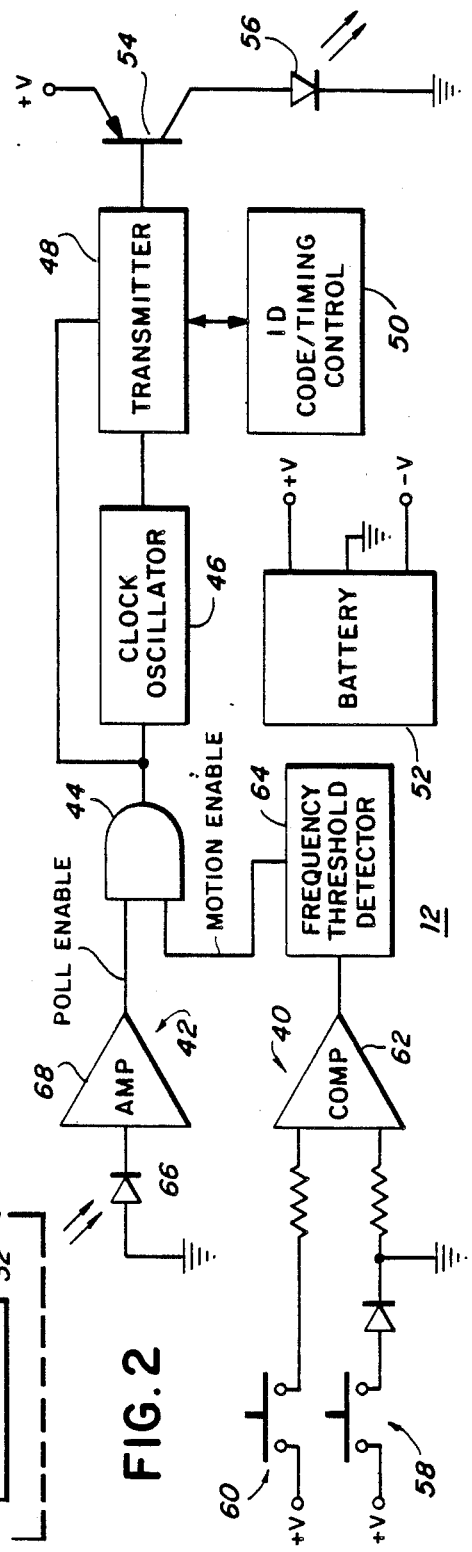

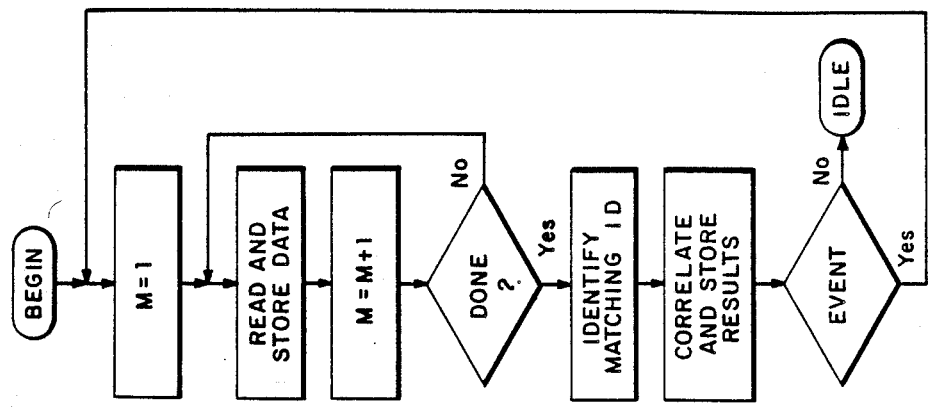
FIG. 4
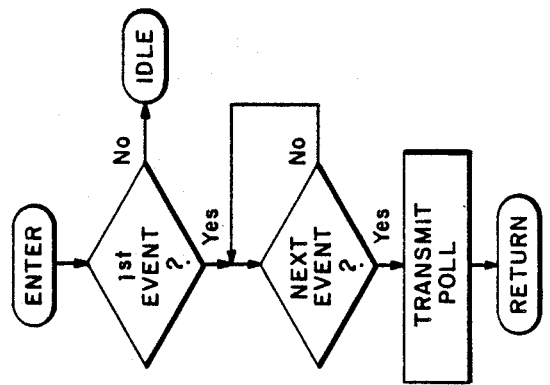
FIG. 3C
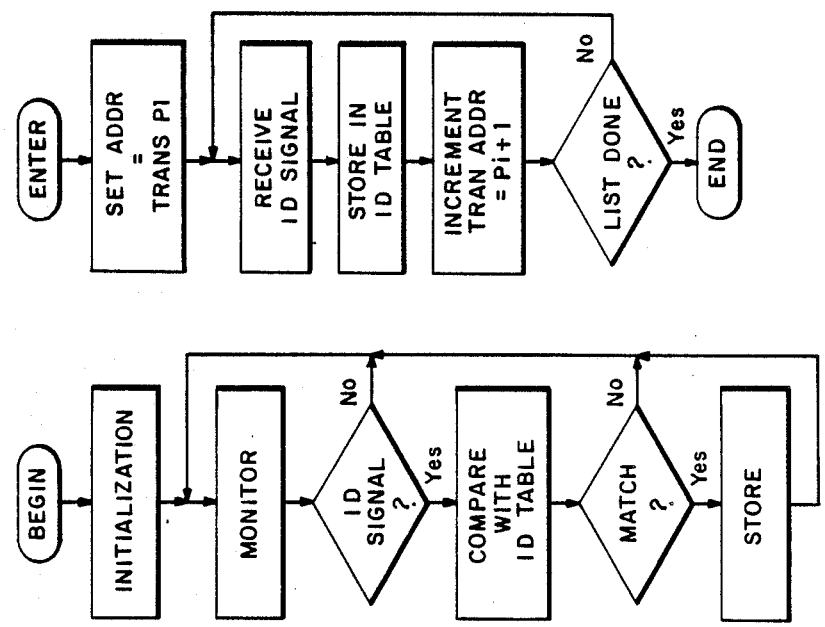
FIG. 3B
FIG. 3A

METHOD AND APPARATUS FOR IDENTIFYING INDIVIDUAL MEMBERS OF A MARKETING AND VIEWING AUDIENCE

BACKGROUND OF THE INVENTION

A. Field of the Invention

The present invention relates generally to marketing data collection systems, and more particularly to a method and apparatus for identifying individual members in a plurality of monitored areas for use with television audience measurement and marketing data collection systems.

B. Description of the Prior Art

Various program identification and television audience measurement and marketing research systems are known. Such systems fall into various categories. One category includes manual systems where the viewer keeps a diary indicating, such as programs viewed and products purchased. Such manual systems are prone to inaccuracies resulting from the entry of erroneous data that may be intentionally or unintentionally entered and are slow in acquiring data.

Another category includes partly automated systems that require active participation by the viewer or marketing member. U.S. Pat. No. 4,546,382 to McKenna et al. describes a television and market research data collection system wherein the panelist uses an optical scanning device for scanning bar codes of purchased products and a channel selector to enter channel numbers to answer questionnaire questions. U.S. Pat. No. 4,331,973 to Eskin et al. describes a system wherein the panelist presents a panelist identification card to cooperating retail stores where the panelist identification card is scanned by a universal product coding (UPC) scanner along with purchsed products. Such requirements for active participation by the individual audience or marketing members advantageously is minimized or avoided.

Another category includes systems generally limited to televison audience measurement applications. For example, U.S. Pat. No. 4,652,915 to Heller, III describes a system for identifying the presence of TV viewers where the viewer wears a headphone which remains activated to receive audio by transmitting an acknowledgement signal in response to periodic polls.

U.S. Pat. No. 3,056,135 to Currey et al. issued Sept. 25, 1962 and assigned to the same assignee as the present aapplication describes a method and apparatus for automatically determining the listening habits of wave signal receiver users. The method disclosed in Currey et al. provides a record of the number and types of persons using a wave singal receiver by monitoring the operational conditions of the receiver and utilizing both strategically placed switches for counting the number of persons entering, leaving and within a particular area and a photographic recorder for periodically recording the composition of the audience. A mailable magazine provides a record of both the audience composition and the reciver operation information for manual processing by a survey organization. Thus a disadvantage is that acquiring data is slow and further many viewing audience members object to being identified from the photographic record.

U.S. Pat. No. 4,644,509 to Kiewit et al. issued Feb. 17, 1987 and assigned to the same assignee as the present application discloses an ultrasonic, pulse-echo method and apparatus for determining the number of persons in the audience and the composition of the audience of a radio receiver and/or a television receiver. First and second reflected ultrasonic wave maps of the monitored area are collected, first without people and second with people who may be present in the monitored area. The first collected background defining map is subtracted from the second collected map to obtain a resulting map. The resulting map is processed to identify clusters having a minimum intensity. A cluster size of the thus identified clusters is utilized to identify clusters corresponding to people in an audience. While this arrangement is effective for counting viewing audience members, individual audience members can not be identified.

SUMMARY OF THE INVENTION

It is an object of the present invention to provide a method and apparatus for identifying predetermined individual members of a television viewing audience/marketing group in a plurality of monitored areas.

It is an object of the present invention to provide an method and system for identifying predetermined individual members of a television viewing audience/marketing group in a retail marketing monitored area and correlating the identified individual members with television viewing habits.

Therefore, in accordance with a preferred embodiment of the invention, there are provided a method and apparatus for identifying predetermined individual members in a plurality of monitored areas. A plurality of predetermined identification signals are stored each corresponding to one of the predetermined individual members. A transmitter device for transmitting a unique predetermined identification signal is associated with each of the predetermined individual members A receiver device in each of the plurality of monitored areas receives the transmitted predetermined identification signals and applies the received signals to an associated memory device used for storing the received individual member signals. A central processor periodically retrieves the stored individual member signals for each memory device. The received predetermined identification signals are compared with the stored predetermined identification signals to identify the predetermined individual members and further processed to correlate identified individual members at different ones of the monitored areas.

In accordance with a feature of the invention, circuitry is provided for detecting movement of the transmitter devices associated with the predetermined individual members, so that incorrect identification of individual members in a television viewing audience is avoided.

DESCRIPTION OF THE DRAWING

These and other objects and advantages of the present invention will become readily apparent upon consideration of the following detailed description and attached drawing wherein:

FIG. 1 is a block diagram of an individual member identification apparatus according to the present invention;

FIG. 2 is a schematic diagram representation of a transmitter according to the present invention;

FIGS. 3A–3C are flow charts illustrating the logical steps performed by the apparatus of FIG. 1; and FIG. 4 is a flow chart illustrating the logical steps performed by a central computer of the apparatus of FIG. 1.

DETAILED DESCRIPTION OF THE PREFERRED EMBODIMENT

Referring now to the drawing, with particular attention to FIG. 1, there is illustrated a block diagram of a new and improved individual member detecting and identification apparatus according to the invention generally designated by the reference numeral 10. The individual member detecting and identification apparatus 10 is provided near the entrances to a retail store to identify predetermined individual members entering and leaving the retail store and near a monitored television to identify television viewing habits.

In FIG. 1, the apparatus 10 is depicted and generally described for use with a television receiver to identify individual members of a viewing audience. The individual member identification apparatus 10 is useful for a variety of marketing research and data collection systems and applications and it should be understood that the principles of the present invention are not limited to these particular applications.

The individual member detecting and identification apparatus 10 includes a plurality of transmitter devices ($P_1$)-($P_T$) designated as 12. Each transmitter 12 transmits a unique identification signal associated with one of the predetermined individual members to be detected and identified within a monitored area. EAch transmitter device 12 advantageously is small-sized and configured, for example, such as, a bracelet, necklace, belt buckle or the like, to be worn by the individual member.

Each transmitter 12 includes motion detection circuitry to transmit its identification signal only when enabled responsive to detected motion so that only viewing audience members are identified. Each transmitter 12 can be arranged to transmit its identification signal at periodic intervals and responsive to a received polling signal. Alternatively the transmitters 12 transmit the predetermined identification signal only responsive to a received polling signal in order to minimize power consumption by each transmitter 12. While either radio frequency or infrared signalling technique can be employed; preferably infrared signals are utilized in order to more accurately define a monitored area relative to a monitored television receiver.

A transceiver 14 receives the transmitted identification signals and applies the received signals to a processor device, such as a microprocessor 16. The transceiver 14 preferably is provided by a transceiver device including a transmitter device for transmitting a polling signal under the program control by the microprocessor 16. Associated memory devices, such as a random access memory RAM 18 for data storage, and a read only memory ROM 20 for program storage are used in conjunction with the microprocessor 16. Various commercially available microprocessor devices can be utilized for the microprocessor 16, such as an eight-bit Motorola microprocessor device HCMOS MC68HC11. The MC68HC11 microprocessor 16 includes a programmable timer system that advantageously can be used to maintain a real time reference for storing with the identified audience member data. On-chip peripheral functions including a serial communications interface (SCI) subsystem and an 8-channel analog-to-digital (A/D) converter are provided by MC68HC11 microprocessor 16. A terminal 22 coupled to the microprocessor 16 is used during installation of the apparatus 10 and to enable testing.

A data storage and communication device 24 takes the data from the microprocessor 16 via one of various known communication methods and stores the data for subsequent retrieval, usually via a telephone line connected to the public switched telephone network, by a central computer 26.

Apparatus 10 is shown in conjunction with a television measurement subsystem designated generally as 28. A channel detection device 30 is associated with a monitored television receiver 32. Channel detection apparatus, for example, such as disclosed in U.S. Pat. No. 4,723,302 issued Feb. 2, 1988 to Fulmer et al. can be employed for the channel detection device 30. An ON/OFF probe 34 is used for monitoring the ON/OFF operational modes of the monitored television 32. Various conventional detectors can be employed for the ON/OFF probe 34, for example, the probe may include tuned circuitry for detecting a characteristic frequency of the horizontal retrace oscillator in the television display. An ON/OFF threshold circuit 36 is used in conjunction with the ON/OFF probe 34 to provide a signal to the microprocessor 16 corresponding to the ON and OFF operational functions of the television receiver 32.

Referring now to FIG. 2, a partly schematic block diagram representation of the transmitter 12 is shown. Transmitter 12 includes a motion detection circuit 40 for detecting movement of a particular viewing audience member associated with the transmitter 12 and provides an enable signal at a line MOTION ENABLE. A receiver enable circuit 42 receives a transmitted polling signal from the transceiver 14 and provides an enable signal at a line POLL ENABLE. The enable signals of the motion detection circuit 40 and the receiver enable circuit 42 are applied to an AND gate 44 which provides an enable input to both a clock oscillator device 46 and a transmitter section 48. An identification code and timing control logic block 50 stores both a predetermined identification signal and a time delay value that corresponds to a particular individual member. The identification code and timing control logic block 50 provides the predetermined time delayed identification signal to the transmitter section 48 so that data collisions between multiple transmitters 12 are avoided. A DC power source such as a rechargeable battery pack 52 provides operating power for the transmitter 12. A bipolar PNP transistor 54 coupled at its base to a transmission output of the transmitter section 48 operatively drives a optoelectronic diode 56.

The motion detection circuit 40 includes a pair of switches 58 and 60, for example, such as mercury tilt type switches coupled to an operational amplifier 62. Tilt switch 58 is arranged to provide normally open contacts when the transmitter 12 is being worn. For example, the tilt switch 58 is generally vertically disposed within the transmitter 12 in its normal orientation when the transmitter 12 is worn by a particular audience member. Otherwise, the tilt switch 58 provides closed contacts when horizontally disposed when the transmitter 12 is removed. Tilt switch 60 is adapted to open and close as the transmitter 12 moves corresponding to movement of the particular audience member wearing the transmitter 12. The operational amplifier 62 is arranged as a comparator with an alternating high/low input provided via tilt switch 60 and a normal ground reference second input. A high reference voltage is provided to the second input when the tilt switch 58 is horizontally disposed resulting from the transmitter 12 not being worn. The normally alternating high/low output of comparator 62 is applied to a frequency threshold detector circuit 64. The threshold detector circuit 64 provides a high enable signal responsive to the received signal output of comparator 62 equal to or above a predetermined threshold frequency value. Otherwise, when the received signal output of the comparator 62 is below the predetermined threshold frequency value a low output signal is applied by the threshold detector circuit 64 to the AND gate 44.

An optoelectronic diode 66 and an amplifier pulse width modulator stage 68 form the receiver enable circuit 42. A transmitted polling signal from the transceiver 14 activates the optoelectronic diode 66. The optical to electrical converted signal of the diode 66 is increased in amplitude and the pulse width is extended by the amplifier stage 68 and applied to the AND gate 44.

When both the motion detection circuit 40 and the receiver enable circuit 42 apply a high enable signal to the AND gate 44, an enable input is applied to the clock oscillator device 46 and the transmitter section 48. Otherwise when either the motion detection circuit 40 or the receiver enable circuit apply a low signal to the AND gate 44, the resulting low output of the AND gate 44 is effective to disable the clock oscillator 46 and transmitter 48.

The operation of the individual member detection and identification apparatus 10 will now be described with reference to the flow charts shown in FIGS. 3A–3C. Referring initially to FIG. 3A, the sequential operations of the microprocessor 16 begin with an initialization routine. Then the microprocessor 16 monitors the input signals from the transceiver 14. Identified received signals are compared with a stored identification signals table to identify a match. When determined that an identified received signal matches a stored identification signal, the coded identification signal corresponding to an identified individual member is stored. Then sequential monitoring operations continue.

FIG. 3B illustrates the sequential operations of the microprocessor 16 to store the identification signals table. These sequential operations include receiving a coded identification signal from each of the transmitters 12 and storing the received signal at set address locations to form the identification signal table.

FIG. 3C illustrates the sequential operations of the microprocessor 16 for tansmitting polling signals. The microprocessor 16 performs an idle operational mode until a first predetermined event is detected. When the individual member detecting and identification apparatus 10 is used in conjunction with the television measurement subsystem 28, the first predetermined event to be detected is an ON operational mode of the television receiver 32. When the individual member detecting and identification apparatus 10 is used in a retail store, the first predetermined event to be detected is a predetermined hour of the day corresponding to the starting buisness hour of the retail store. After a next predetermined event is detected, the microprocessor 16 enables the transceiver 14 to transmit a polling signal. The next predetermined event includes a predetermined elapsed time interval. In the retail store environment this time interval can be on the order of a few seconds, while a longer time interval advantageously is employed when the apparatus 10 is used with a television measurement subsystem 28. Other next events of the apparatus 10 used with a television measurement subsystem 28 include a detected channel change of the monitored receiver 32.

FIG. 4 illustrates the sequential operations of the central computer 26 to periodically retrieve and process data from each of the data storage and communication devices 24. The central computer 26 contains a realtime clock and dialing and interface equipment for establishing communications with each of the remote sites. Each of the data storage and communication devices 24 is interrogated at periodic intervals, for example, once a day, by the central computer 26. The individual member coded identification signals thus collected are processed to identify individual members identified at multiple remote sites.

It should be understood that the central computer 26 can perform the sequential operations shown in FIGS 3A and 3B as described above performed by the microprocessor 16. The received input signals from the transceiver 14 can be stored unchanged without any processing to provide the individual member coded identification signals. Then the central computer 26 first compares the collected stored signals from each of the data storage and communication devices 24 with a stored identification signals table to identify matching signals to identify inidvidual members. Subsequently the central computer 26 correlates identified individual members found at different remote sites.

Although the present invention has been described in connection with details of the preferred embodiment, many alterations and modifications may be made without departing from the invention. Accordingly, it is intended that all such alterations and modifications be considered as within the spirit and scope of the invention as defined in the appended claims.

What is claimed and desired to be secured by Letters Patent is:

1. Apparatus for identifying predetermined individual members in a plurality of monitored areas:
    memory means for storing a plurality of predetermined identification signals, each of said predetermined identification signals corresponding to one of the predetermined individual members;
    transmitter means for transmitting a unique predetermined identification signal associated with each of the predetermined individual members;
    receiver means for receiving said transmitted predetermined identification signals; said receiver means provided in each of the plurality of monitored areas, said plurality of monitored areas including at least one retail establishment monitored area and at least one television viewing monitored area;
    means coupled to said receiver means for storing said received identification signals,
    first processor means for comparing each of said received identification signals with said stored predetermined identification signals to identify each predetermined individual member; and
    second processor means for correlating each said identified predetermined individual member at different ones of the monitored areas.

2. Apparatus as recited in claim 1 wherein said first processor means is coupled to said receiver means in each of the plurality of monitored areas.

3. Apparatus as recited in claim 1 further comprises:
    means for identifying a current time reference;

means for identifying a tuned channel of a television receiver located within said at least one television viewing monitored area; and means for storing said identified current time reference with said received identification signals and said identified tuned channel data.

4. Apparatus as recited in claim 1 wherein said second processor means comprises:

a central comupter, said central computer including means for communicating with each said storage means to transfer said stored received identification signals.

5. Apparatus as recited in claim 1 wherein each said receiver means comprises second transmitter means for transmitting a polling signal.

6. Apparatus as recited in claim 5 wherein each said transmitter means for transmitting a unique predetermined identification signal associated with each of the predetermined individual members comprises a remote control transmitter for transmitting responsive to receiving said transmitted polling signal.

7. Apparatus as recited in claim 1 wherein each said transmitter means include means for detecting motion and means responsive to said detected motion for enabling each said transmitter means.

8. Apparatus as recited in claim 1 wherein said first processor means comprises means for detecting a first predetermined event and wherein said first processor means is responsive to said detected first predetermined event for processing said received identification signals.

9. Apparatus as recited in claim 8 wherein said means for detecting a first predetermined event in said at least one retail establishment monitored area include means for detecting a predefined time of day corresponding to a starting business hour of the retail establishment.

10. Apparatus as recited in claim 3 further comprises means for detecting a first predetermined event of an ON operational mode of said television receiver and wherein said first processor means is responsive to said detected predetermined event for processing said received predetermined identification signals.

11. Apparatus as recited in claim 10 further comprising means for detecting second predetermined events, said second predetermined events include an elapsed time period and wherein said first processor means is responsive to said detected second predetermined event for processing said received predetermined identification signals.

12. Apparatus as recited in claim 11 wherein said means for detecting second predetermined events include means for detecting a channel change of the monitored receiver.

13. Apparatus as recited in claim 5 further comprising means for detecting predetermined events and wherein said means for transmitting a polling signal is responsive to each said detected predetermined event.

14. A method for identifying predetermined individual members in a plurality of monitored areas comprising the steps of:

storing a plurality of predetermined identification signals, each of said predetermined identification signals corresponding to one of the predetermined individual members;

providing a transmitter device associated with each of the predetermined individual members for transmitting a unique predetermined identification signal;

providing a receiver device in each of said plurality of monitored areas for receiving said transmitted identification signals, said plurality of monitored areas including at least one retail establishment monitored area and at least one television viewing monitored area;

comparing each of said received identification signals with said stored predetermined identification signals to identify each predetermined individual member; and correlating each said identified predetermined individual member at different ones of the monitored areas.

15. A method as recited in claim 14 further comprising the steps of:

providing a memory device for storing said received identification signals; and periodically transmitting said stored identification signals to a central computer 16. A method as recited in claim 15 further comprising the steps of:

identifying a current time reference responsive to each of said received identification signals; and storing each said received identification signal with each said identified current time reference.

17. A method as recited in claim 14 further comprising the steps of:

providing each said transmitter means with receiver means for receiving a polling signal; and enabling each said transmitter means for transmitting a unique predetermined identification signal responsive to said received polling signal.

18. A method as recited in claim 14 further comprising the steps of:

providing each said transmitter means with motion detecting means; and enabling each said transmitter means for transmitting a unique predetermined identification signal responsive to said detected motion.

19. A marketing data collection system comprising:

a plurality of remotely located monitoring stations, each monitoring station for collecting and storing predetermined operational data in a monitored area; wherein at least one remotely located monitoring station monitors an area of an entrance to a retail establishment and wherein at least one of said remotely located monitoring stations is a television audience measurement station and monitors an area proximate to a monitored television;

transmitter means for transmitting a unique predetermined identification signal associated with each of the predetermined individual members to be identified;

each of said remotely located monitoring stations including;

means for receiving said transmitted predetermined identification signals and for storing said signals as part of said operational data;

a central computer arranged for communication with each of said monitoring stations for receiving said stored predetermined operational data; said central computer including;

memory means for storing a plurality of predetermined identification signals, each of said predetermined identification signals corresponding to one of the predetermined individual members;

means for comparing each of said received identification signals with said stored predetermined identification signals to identify the predetermined individual member; and means for correlating each said identified predetermined individual member at different ones of the monitoring stations.

* * * * *